(12) United States Patent
Jeon et al.

(10) Patent No.: US 11,438,601 B2
(45) Date of Patent: *Sep. 6, 2022

(54) METHOD FOR ENCODING/DECODING IMAGE AND DEVICE USING SAME

(71) Applicant: RESEARCH & BUSINESS FOUNDATION SUNGKYUNKWAN UNIVERSITY, Suwon-si (KR)

(72) Inventors: Byeung Woo Jeon, Seongnam-si (KR); Seung Ha Yang, Suwon-si (KR); Hiuk Jae Shim, Chuncheon-si (KR); Da Hee Lee, Wonju-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/320,704

(22) Filed: May 14, 2021

(65) Prior Publication Data

US 2021/0274195 A1    Sep. 2, 2021

Related U.S. Application Data

(63) Continuation of application No. 15/320,108, filed as application No. PCT/KR2015/006269 on Jun. 19, 2015, now Pat. No. 11,044,482.

(30) Foreign Application Priority Data

Jun. 20, 2014  (KR) .................. 10-2014-0075866
Mar. 5, 2015   (KR) .................. 10-2015-0031040

(51) Int. Cl.
   *H04N 19/176*  (2014.01)
   *H04N 19/52*   (2014.01)
   (Continued)

(52) U.S. Cl.
   CPC ......... *H04N 19/176* (2014.11); *H04N 19/105* (2014.11); *H04N 19/139* (2014.11);
   (Continued)

(58) Field of Classification Search
   CPC .. H04N 19/593; H04N 19/105; H04N 19/119; H04N 19/154; H04N 19/176; H04N 19/11
   See application file for complete search history.

(56) References Cited

U.S. PATENT DOCUMENTS 8,565,310 B2 * 10/2013 Pearlstein ............... H04N 19/61
                                                         375/240.16
10,142,654 B2 * 11/2018 Peng .................... H04N 19/105
(Continued)

FOREIGN PATENT DOCUMENTS

| CN | 101965733 A | 2/2011 |
| KR | 10-2013-0067038 A | 6/2013 |
| KR | 10-2013-0109976 A | 10/2013 |

OTHER PUBLICATIONS

E. Alshina, et al., "AhG5: Cross-check for prediction of displacement vector in intra block copying," *Proceedings of the 15th Meeting of the Joint Collaborative Team on Video Coding (JCT-VC) of ITU-T SG 15 WP 3 and ISO/IEC JTC 1/SC 29/WG 11*, Geneva, CH, Oct. 23-Nov. 1, 2013, pp. 1-3.

(Continued)

*Primary Examiner* — Zaihan Jiang
(74) *Attorney, Agent, or Firm* — NSIP Law

(57) ABSTRACT

A method for decoding an image, according to the present invention, can comprise the steps of: drawing out a vector predictor of a block vector for indicating a reference block with respect to a current block to be predicted within a current picture; drawing out the block vector on the basis of the vector predictor and a vector differential value corresponding to a different value of the block vector and the (Continued)

vector predictor; and generating a prediction block with respect to the current block on the basis of the block vector.

9 Claims, 6 Drawing Sheets

(51) Int. Cl.
  *H04N 19/463* (2014.01)
  *H04N 19/105* (2014.01)
  *H04N 19/139* (2014.01)
  *H04N 19/513* (2014.01)

(52) U.S. Cl.
  CPC ......... *H04N 19/463* (2014.11); *H04N 19/513* (2014.11); *H04N 19/52* (2014.11)

(56) References Cited

U.S. PATENT DOCUMENTS

| | | | | |
|---|---|---|---|---|
| 2008/0253456 | A1* | 10/2008 | Yin | H04N 19/172 |
| | | | | 375/E7.181 |
| 2009/0010337 | A1* | 1/2009 | Wang | H04N 19/563 |
| | | | | 375/E7.123 |
| 2011/0293010 | A1* | 12/2011 | Jeong | H04N 19/513 |
| | | | | 375/E7.125 |
| 2012/0114039 | A1* | 5/2012 | Wang | H04N 11/02 |
| | | | | 375/E7.243 |
| 2013/0127987 | A1* | 5/2013 | Zhang | H04N 19/61 |
| | | | | 348/42 |
| 2013/0170546 | A1 | 7/2013 | Kim et al. | |
| 2015/0189272 | A1* | 7/2015 | Peng | H04N 19/593 |
| | | | | 375/240.02 |
| 2015/0195559 | A1* | 7/2015 | Chen | H04N 19/11 |
| | | | | 375/240.16 |
| 2015/0264355 | A1* | 9/2015 | Hsiang | H04N 19/517 |
| | | | | 375/240.02 |
| 2015/0334405 | A1* | 11/2015 | Rosewarne | H04N 19/176 |
| | | | | 375/240.02 |
| 2015/0373366 | A1* | 12/2015 | He | H04N 19/90 |
| | | | | 375/240.16 |
| 2015/0373370 | A1* | 12/2015 | Rapaka | H04N 19/52 |
| | | | | 375/240.02 |
| 2016/0330474 | A1* | 11/2016 | Liu | H04N 19/523 |

OTHER PUBLICATIONS

Xiaozhong Xu, et al., "Simplification on block vector prediction for intra block copy," *Proceedings of the 16$^{th}$ Meeting of the Joint Collaborative Team on Video Coding (JCT-VC) of ITU-T SG 16 WP 3 and ISO/IEC JTC 1/SC 29/WG 11*, San Jose, US, Jan. 9-17, 2014, pp. 1-5.

Patrice Onno, et al., "AhG5: On the displacement vector prediction scheme for intra Block Copy," *Proceedings of the 17$^{th}$ Meeting of the Joint Collaborative Team on Video Coding (JCT-VC) of ITU-T SG 16 WP 3 and ISO/IEC JTC 1/SC 29/WG 11*, Valencia, ES, Mar. 27-Apr. 4, 2014, pp. 1-6.

International Search Report dated Sep. 22, 2015, in counterpart International Application No. PCT/KR2015/006269 (2 pages in English, 3 pages in Korean).

* cited by examiner

METHOD FOR ENCODING/DECODING IMAGE AND DEVICE USING SAME

CROSS REFERENCE TO RELATED APPLICATION(S)

This application is a continuation of U.S. application Ser. No. 15/320,108, filed on Dec. 19, 2016, which is a National Phase entry of International Application No. PCT/KR2015/006269, filed on Jun. 19, 2015, which claims priority under 35 U.S.C. § 119(e), to Korean Application No. 10-2014-0075866, filed on Jun. 20, 2014 and Korean Application No. 10-2015-0031040, filed on Mar. 5, 2015, the entire disclosures of each of which are incorporated herein by reference for all purposes.

TECHNICAL FIELD

The present invention relates generally to video encoding/decoding, and more particularly, to a method and apparatus for video encoding/decoding, which generate a prediction block using a current picture.

BACKGROUND ART

Along with the increasing popularity of High Definition (HD) broadcasting service all over the world including Korea, a large number of users enjoy high-resolution, high-quality videos. In this context, many institutes have made much effort to develop future-generation video devices. Further, as Ultra High Definition (UHD) TV offering a resolution higher than HDTV by four times has attracted more and more interest, compression techniques for higher-resolution, higher-quality videos are required.

There are a variety of video compression techniques including inter-prediction in which pixel values included in a current picture are predicted from a picture previous to the current picture and/or a picture following the current picture in time, intra-prediction in which pixel values included in a current picture are predicted using pixel information within the current picture, and entropy encoding in which a short code is assigned to a more frequent value and a long code is assigned to a less frequent value.

Among prediction techniques for video prediction, intra-prediction compresses an image by eliminating a spatial similarity in a current frame or a current picture. During intra-prediction, the prediction value of a current prediction block is generated referring to pixel values of a block neighboring to a current block, and information about the prediction value is signaled (unless otherwise specified, the terms, picture and frame are interchangeably used hereinbelow).

Among the prediction techniques for video prediction, inter-prediction compresses an image by eliminating a temporal similarity between different pictures or frames. During inter-prediction, a region having pixel values close to those of a current block is detected in another picture or frame, and used as the prediction value of a current prediction block.

The position of the prediction value determined by motion search, that is, motion estimation is represented as a Motion Vector (MV), and the MV may be represented as an MV predictor MVp and an MV difference MVd.

An MV is expressed as the following equation, using an MV predictor MVp and an MV difference MVd.

$$\vec{MV} = \vec{MVp} + \vec{MVd} \qquad \text{[Equation 1]}$$

In intra-prediction as used at present, since a prediction block for a current block is generated using a block neighboring to the current block, pixels in a region spatially apart from the current block may not be referred to. Moreover, inter-prediction has the limitation that even though there is a region having pixel values close to those of a current block in a current picture, the region cannot be used as a prediction value for the current block.

DISCLOSURE

Technical Problem

An object of the present invention is to provide a video encoding/decoding method for increasing a coding efficiency by performing prediction in a manner that eliminates a spatial similarity between blocks spatially apart from each other in a same picture during video compression, and an apparatus using the same.

Another object of the present invention is to provide a technique for selecting a prediction vector for a block to be encoded, by Intra Block Copy (IBC) prediction, and efficiently signaling the selected prediction vector.

Another object of the present invention is to provide a technique for, when a similar pattern occurs repeatedly in a picture, increasing a coding efficiency during video compression by performing prediction on the pattern on a per-block basis.

Technical Solution

In an aspect of the present invention, a video decoding method may include deriving a vector predictor of a block vector indicating a reference block for a current block to be predicted in a current picture, deriving the block vector based on the vector predictor and a vector difference corresponding to a difference between the block vector and the vector predictor, and generating a prediction block for the current block based on the block vector.

The prediction block may be generated by filtering a value of the reference block.

The filtering may be performed using one of a filter preset between an encoder and a decoder, and a filter signaled by information in a bit stream.

One vector predictor may be derived.

The vector predictor may be a predetermined initial value.

The vector predictor may be a block vector of a block decoded before the current block.

The video decoding method may further include generating a candidate list including a plurality of vector predictors, and parsing a predictor index indicating at least one of the vector predictors included in the candidate list. The deriving of the block vector may include deriving the block vector based on a vector predictor specified by the predictor index.

The candidate list may include a predetermined initial value as one of the vector predictors.

The initial value may be allocated to a first predictor index.

The generation of a candidate list may include assigning a lower predictor index to the block vector of a block having a higher temporal proximity in decoding order to the current block, among the block vectors of blocks decoded before the current block.

The generation of a candidate list may include assigning a lower predictor index to the block vector of a block spatially nearer to the current block, among the block vectors of blocks decoded before the current block.

If a plurality of predictor indexes are parsed, the generation of a prediction block may include generating the predictor block based on a plurality of reference blocks indicated by a plurality of block vectors.

A value of the prediction block may be a weighted average of values of the reference blocks.

The weighted average may be determined based on the predictor index used to derive the block vector.

In another aspect of the present invention, a video encoding method may include deriving a vector predictor of a block vector indicating a reference block for a current block to be predicted in a current picture, and encoding information indicating the vector predictor and a vector difference corresponding to a difference between the block vector and the vector predictor, and signaling the encoded information.

Advantageous Effects

According to an embodiment of the present invention, if a similar pattern occurs repeatedly in a picture, prediction is performed on the pattern on a per-block basis. Therefore, a coding efficiency can be increased in video compression.

Specifically, the effect of the present invention may become conspicuous in encoding and decoding of an artificial image created by a computer.

BEST MODE

Embodiments of the present invention are described in detail with reference to the accompanying drawings. Lest it should obscure the subject matter of the present invention, a detailed description of a known configuration or function will be omitted.

When it is said that a component is "coupled with/to" or "connected to" another component, it should be understood that the one component is connected to the other component directly or through any other component. In the present invention, the term "have", "may have", "include", or "may include" signifies the presence of a specific component, not excluding the presence of one or more other components.

The term, first or second may be used to describe various components, not limiting the components. These expressions are used only to distinguish one component from another component. For example, a first component may be referred to as a second component and vice versa without departing from the scope of the present disclosure.

While components are shown as independent to represent different characteristic functions in embodiments of the present invention, this does not imply that the components are configured as separate hardware or software units. In other words, although each component is described and illustrated as independent for the convenience of description, two or more components may be incorporated into a single component, or one component may be separated into a plurality of components, for function execution. An embodiment with components incorporated into one component and an embodiment with a component separated into a plurality of components fall within the scope of the present invention, as far as they do not depart from the spirit of the present invention.

Some components may not be mandatory in executing a key function in the present invention, but be optional just to improve performance. The present invention may be implemented only with components essential to realization of the subject matter of the present invention, excluding components used to improve performance. This structure also falls within the scope of the present invention.

Figure 1:
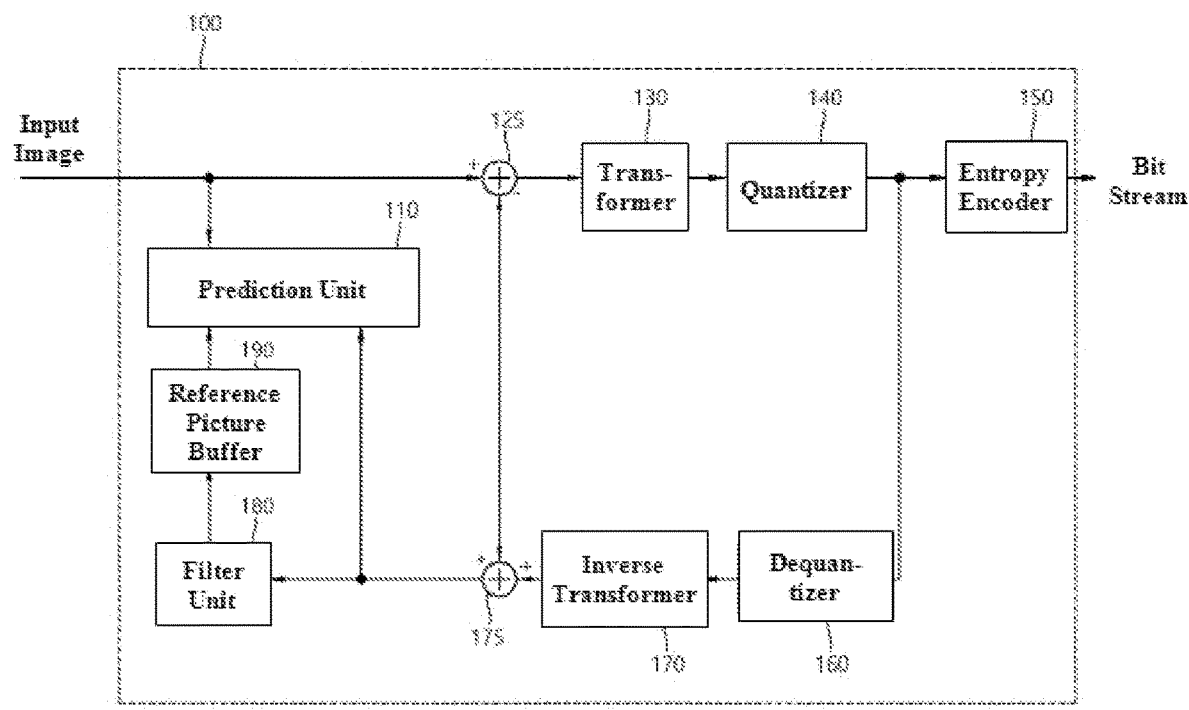
FIG. 1 is a block diagram of a video encoder according to an embodiment.

FIG. 1 is a block diagram of a video encoder according to an embodiment. A scalable video encoding/decoding method or apparatus may be implemented by extending a general video encoding/decoding method or apparatus that does not provide scalability. The block diagram of FIG. 1 illustrates an embodiment of a video encoder based on which a scalable video encoder may be implemented.

Referring to FIG. 1, a video encoder 100 includes a prediction unit 110, a subtractor 125, a transformer 130, a quantizer 140, an entropy encoder 150, a dequantizer 160, an inverse transformer 170, an adder 175, a filter unit 180, and a reference picture buffer 190.

The video encoder 100 may encode an input image in intra mode or inter mode and output a bit stream. The prediction unit 110 may perform intra-prediction in case of the intra mode, and inter-prediction in case of the inter mode. Intra-prediction refers to prediction within a picture, and inter-prediction refers to prediction between pictures. The video encoder 100 may generate a prediction block for an input block of the input image and then encode a difference between the input block and the prediction block, according to the intra mode or inter mode.

The prediction unit may include, as its components, an intra prediction unit for performing intra-prediction, a motion prediction unit and a motion compensator for performing inter-prediction, and an Intra Block Copy (IBC) prediction unit for performing IBC prediction. The video encoder may include a switch (not shown), and the switch may switch among the inter prediction unit, the intra prediction unit, and the IBC prediction unit.

In case of the intra mode, the intra prediction unit may generate a prediction block by performing spatial prediction using pixel values of an already encoded block neighboring to a current block.

In case of the inter mode, the motion prediction unit may obtain a motion vector by detecting a region most matching to an input block in a reference picture stored in the reference picture buffer 190. The motion compensator may generate a prediction block by performing motion compensation using the motion vector and the reference picture stored in the reference picture buffer 190.

The IBC prediction unit may determine a region similar to a current block by searching for a similar block in a current picture, generate a prediction block for the current block using the determined region, and obtain a block vector indicating the position of the detected block. Prediction of the IBC prediction unit will be described below in detail.

The subtractor 125 may generate a residual block by a residue between the input block and the generated prediction block. The transformer 130 may output transform coefficients by performing transform on the residual block. The quantizer 140 may output quantized coefficients by quantizing the received transform coefficients according to a quantization parameter.

The entropy encoder 150 may output a bit stream by entropy-encoding symbols according to a probability distribution, based on the values calculated by the quantizer 140, a coding parameter calculated during the encoding, or the like. Entropy encoding is a scheme of representing received symbols having various values as a decodable binary stream by eliminating statistical redundancy.

Herein, a symbol refers to a syntax element to be encoded/decoded, a coding parameter, the value of a residual signal, or the like. The coding parameter is a parameter required for encoding and decoding. The coding parameter refers to information needed for video encoding or decoding, which may include information derivable during encoding or decoding as well as information encoded in an encoder and transmitted to a decoder, such as a syntax element. The coding parameter may include a value or statistics of, for example, intra-prediction/inter-prediction mode, a movement/motion/block vector, a reference picture index, a coded block pattern, the presence or absence of a residual signal, transform coefficients, quantized transform coefficients, a quantization parameter, a block size, and/or block split information. A residual signal may be the difference between an original signal and a prediction signal, a signal obtained by transforming the difference between the original signal and the prediction signal, or a signal obtained by transforming the difference between the original signal and the prediction signal and quantizing the transformed difference. The residual signal may be a residual block at a block level.

If entropy encoding is applied, a symbol with a high occurrence probability is represented in a small number of bits, whereas a symbol with a low occurrence probability is represented in a large number of bits. As a consequence, the size of a bit stream for symbols to be encoded may be reduced. Therefore, entropy encoding may increase the compression performance of video encoding.

For entropy encoding, a coding scheme such as exponential golomb, Context-Adaptive Variable Length Coding (CAVLC), or Context-Adaptive binary Arithmetic Coding (CABAC) is available. For example, the entropy encoder 150 may store a table for performing entropy encoding, such as a Variable Length Coding/Code (VLC) table. The entropy encoder 150 may perform entropy encoding using the stored VLC table. Further, the entropy encoder 150 may derive a binarization method for target symbols, and a probability model of target symbols/bins, and then perform entropy encoding using the derived binarization method or probability model.

The quantized coefficients may be dequantized in the dequantizer 160 and inverse-transformed in the inverse transformer 170. The adder 175 may add the dequantized and inverse-transformed coefficients to the prediction block, thus generating a recovered block.

The recovered block may be subjected to processing in the filter unit 180. The filter unit 180 may apply at least one of a deblocking filter, a Sample Adaptive Offset (SAO), and an Adaptive Loop Filter (ALF) to the recovered block or a recovered picture. The recovered block processed by the filter unit 180 may be stored in the reference picture buffer 190.

Figure 2:
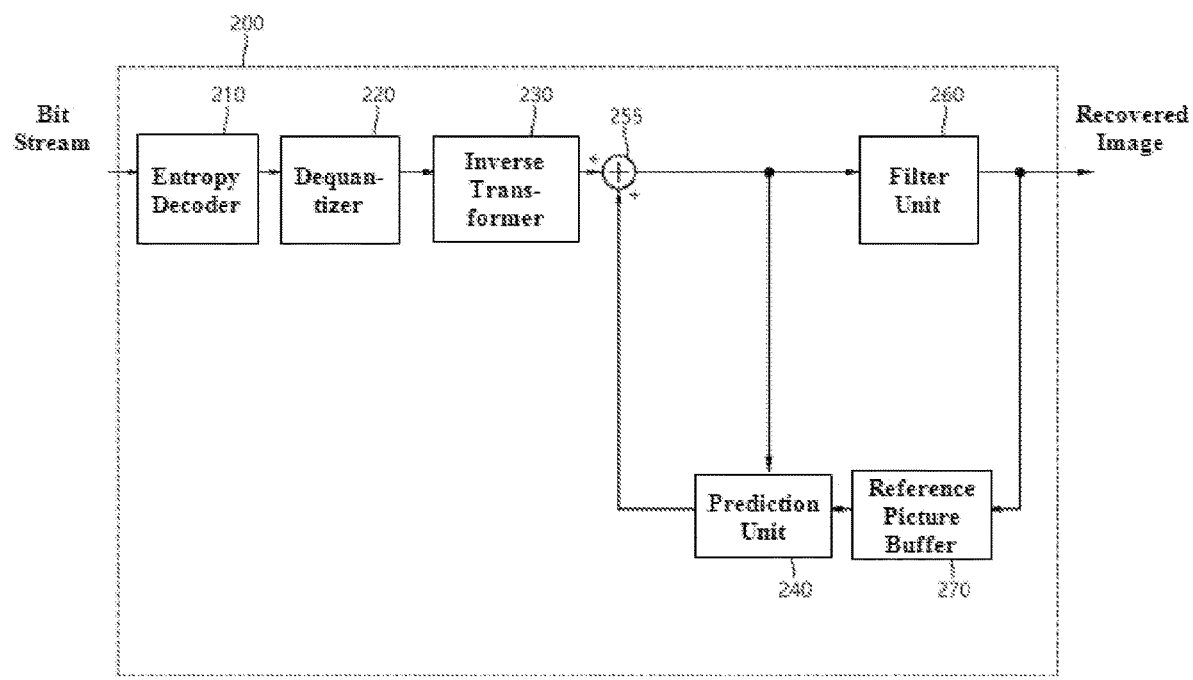
FIG. 2 is a block diagram of a video decoder according to an embodiment.

FIG. 2 is a block diagram of a video decoder according to an embodiment. As described before with reference to FIG. 1, a scalable video encoding/decoding method or apparatus may be implemented by extending a general video encoding/decoding method or apparatus that does not provide scalability. The block diagram of FIG. 2 illustrates an embodiment of a video decoder based on which a scalable video decoder may be implemented.

Referring to FIG. 2, a video decoder 200 includes an entropy decoder 210, a dequantizer 220, an inverse transformer 230, a prediction unit 240, a filter unit 260, and a reference picture buffer 270.

The video decoder 200 may receive a bit stream from a video encoder, decode the received bit stream in intra mode, inter mode, or IBC mode, and thus output a reconstructed image, that is, a recovered image.

The video decoder 200 may generate a reconstructed block, that is, a recovered block by obtaining a recovered residual block from the input bit stream, generate a prediction block, and adding the recovered residual block to the prediction block.

The entropy decoder 210 may generate symbols including symbols in the form of quantized coefficients by entropy-decoding the input bit stream according to a probability distribution. Entropy decoding is a scheme of generating symbols for the input of a binary sequence. Entropy decoding is similar to the afore-described entropy encoding.

The quantized coefficients may be dequantized in the dequantizer 220 and inverse-transformed in the inverse transformer 230. As a result of the dequantization/inverse transform of the quantized coefficients, a recovered residual block may be generated.

The prediction unit 240 may include, as its components, an intra prediction unit for performing intra prediction, a motion prediction unit and a motion compensator which perform inter-prediction, and an IBC prediction unit for performing IBC prediction.

In case of the intra mode, the intra prediction unit may generate a prediction block by compensating spatial prediction using pixel values of an already encoded block neighboring to a current block.

In case of the inter mode, the motion compensator may generate a prediction block by performing motion compensation using a motion vector and a reference picture stored in the reference picture buffer 270.

In case of the IBC prediction, the IBC prediction unit may generate a prediction block by performing IBC compensation using a current picture and a block vector indicating the position of a specific block in the current picture. Compensation of the IBC prediction unit will be described later in greater detail.

The adder 255 adds the recovered residual block to the prediction block. The added block may be subjected to processing in the filter unit 260. The filter unit 260 may apply at least one of a deblocking filter, an SAO, and an ALF to the recovered block or a recovered picture. The filter unit 260 may output a reconstructed image, that is, a recovered image. The recovered image may be stored in the reference picture buffer 270, for use in inter-prediction.

Among the entropy decoder 210, the dequantizer 220, the inverse transformer 230, the predictor 240, the filter unit 260, and the reference picture buffer 270 of the video decoder 200, components with a direct relation to video decoding, for example, the entropy decoder 210, the dequantizer 220, the inverse transformer 230, the predictor 240, and the filter unit 260 may collectively be referred to as a decoding unit, to be distinguishable from the other component.

The video decoder 200 may further include a parser (not shown) for parsing information related to an encoded image, included in a bit stream. The parser may include or may be included in the entropy decoder 210. The parser may be configured as one component of the decoding unit.

Intra-prediction as used at present suffers from the fundamental limitation that since a prediction block for a current block is generated using a block neighboring to the current block, pixels in a region spatially apart from the current block cannot be referred to. Inter-prediction also suffers from the fundamental limitation that in spite of the presence of a region having similar pixel values to those of a current block in a current picture, the region cannot be used as a prediction value for the current block.

To avert the above problems, the present invention proposes IBC prediction mode in which a region identical or similar to a current block is determined by searching for the region in a current picture and used as a prediction value for the current block.

Figure 3:
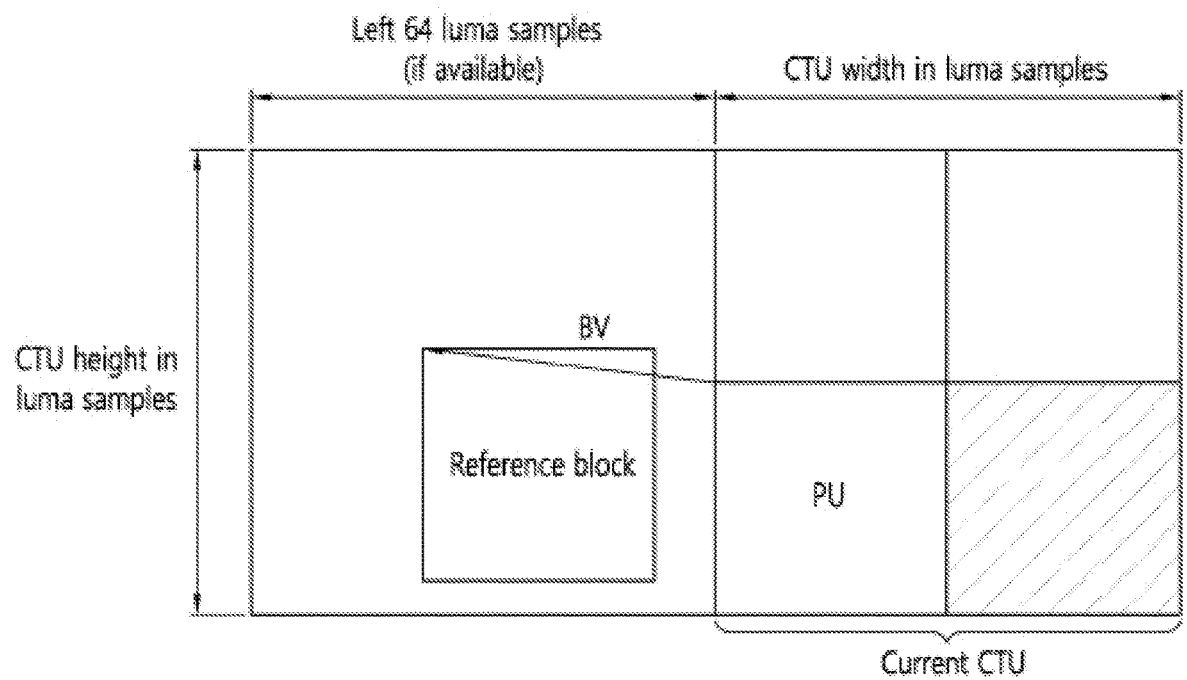
FIG. 3 is a view depicting Intra Block Copy (IBC) prediction according to the present invention.

FIG. 3 is a view depicting IBC prediction according to the present invention.

IBC prediction is a prediction scheme that is effective particularly when there are identical (or similar) regions or objects in a current picture.

In IBC prediction, a specific region in a current picture may be used in generating a prediction block for a current block. For the convenience of description, the specific region of the current picture for use in generating the prediction block for the current block is referred to as a reference block. In IBC prediction, the value of the reference block may be used as it is in generating the prediction block. Or the value of the reference block may be filtered and then used in generating the prediction block. The filtering may be performed by a filter preset between an encoder and a decoder. Or the filtering may be performed by a filter indicated by signaling information in a bit stream. Meanwhile, a Block Vector (BV) may be used to represent the position of the reference block in the current picture, used in generating the prediction block for the current block.

In traditional inter-prediction, a reference picture being a picture in which a prediction block resides is a picture previous to or following a current picture. In contrast, in IBC prediction, a reference picture being a picture in which a prediction block resides is a current picture, and a BV is a vector indicating the prediction block in the current picture.

According to an example of the present invention, as illustrated in FIG. 3, a region in a left Coding Tree Unit (CTU) neighboring to a current prediction block in a current picture may be selected as a reference block for the current prediction block.

During IBC prediction, a region for reference block search may be restricted or may be set to a specific region. For example, it may be restricted that a reference block is searched for in a current CTU to which a current prediction block belongs or in a left CTU neighboring to the current CTU.

The types of prediction blocks subjected to IBC prediction may be 2N×2N, 2N×N, N×2N, and N×N.

Similarly to a Motion Vector (MV), a BV may be derived from a BV predictor and a BV difference.

A BV predictor for a current block may be encoded in an encoder and signaled to a decoder, and a BV of a previously IBC-predicted block in a specific region, for example, a current CTU may be used as the BV predictor.

Since it is necessary to reset or refresh data during video processing, a BV predictor may be initialized as an initial value (−w, 0) on a per-CTU basis. Herein, w may be the width of a current coding unit.

The BV difference is the difference between the BV and the BV predictor. The BV difference may be encoded to BVdx and BVdy in the encoder and signaled to the decoder.

Now, a detailed description will be given of IBC prediction according to the present invention.

Figure 4:
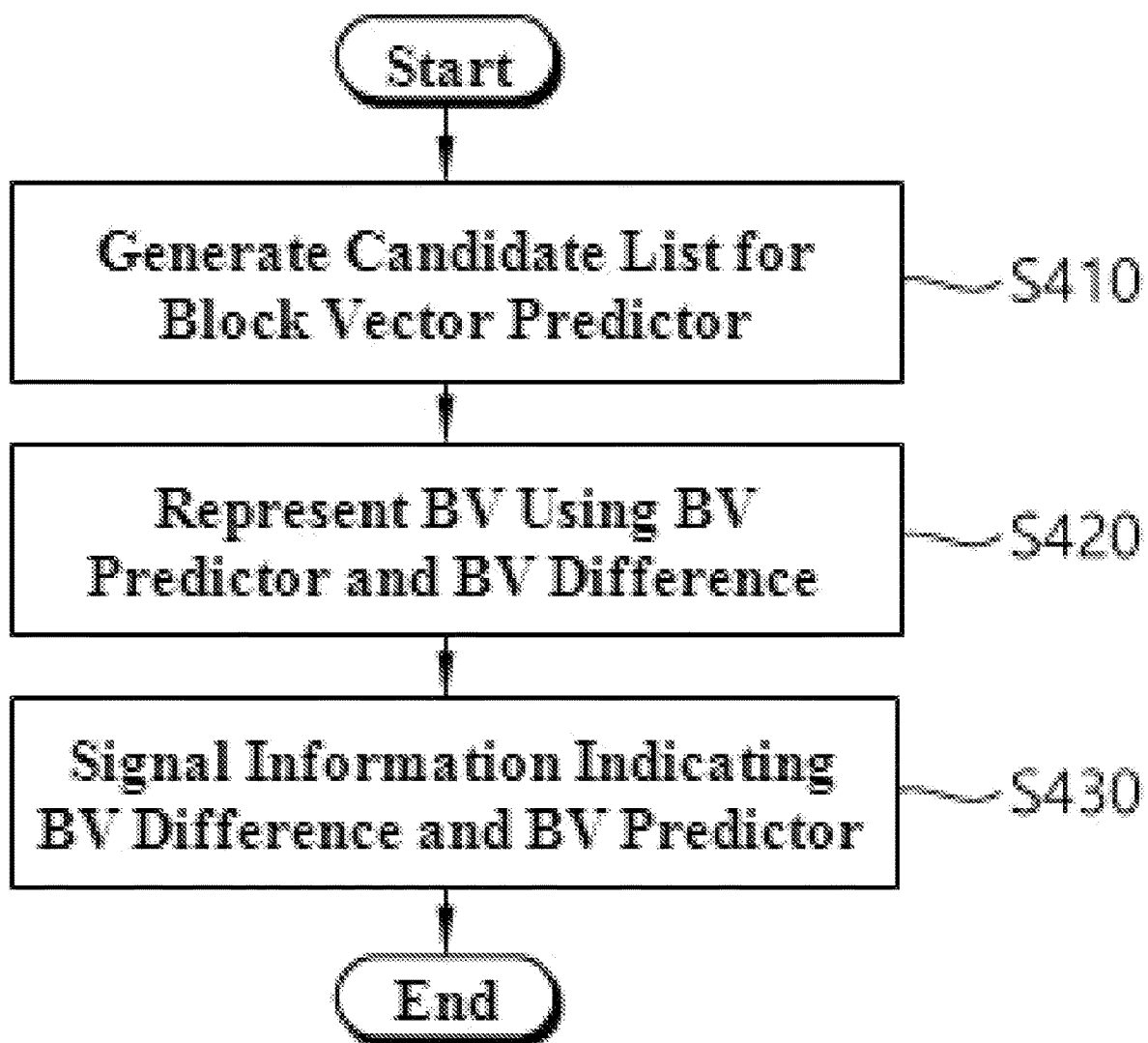
FIG. 4 is a flowchart illustrating a method for encoding an image to which IBC prediction is applied according to an embodiment of the present invention.

FIG. 4 is a flowchart illustrating a method for encoding an image to which IBC prediction is applied according to an embodiment of the present invention.

Referring to FIG. 4, an encoder generates a candidate list for a BV predictor (BVp) to be used as a prediction value of a BV (S410).

The candidate list may include N BVs encoded before a current block.

Further, the BVp candidate list may include the number of blocks encoded in the IBC prediction mode before the current block in a CTU, and an initial value preset referring to the size of the current block (Coding Unit (CU) or Prediction Unit (PU)).

In relation to the generation of the candidate list, the encoder does not signal additional information to the decoder, and both the encoder and the decoder may generate the same candidate list using a predetermined method.

The candidate list may have one or more BV predictors as its entries. If the candidate list includes a single BV predictor, the candidate list may not be generated. Meanwhile, BV predictors in the candidate list may be determined depending on whether the current block is the first block to which the IBC prediction mode is applied in the CTU.

According to an example of the present invention, if one BV predictor is used in IBC prediction and the current block is the first block to which the IBC prediction mode is applied in the CTU, the initial value preset referring to the size of the current block may be set as a BV predictor.

On the other hand, if one BV predictor is used in IBC prediction and there is a block encoded in the IBC prediction mode before the current block in the CTU, a BV encoded right before the current block may be set as the BV predictor of the current block.

Or as described before, the candidate list may include a plurality of BV predictors according to an example of the present invention. Likewise, BV predictors in the candidate list may be determined depending on whether the current block is the first block to which the IBC prediction mode is applied in the CTU.

In the absence of a block encoded in the IBC prediction mode before the current block in the CTU, if the candidate list is configured with k (k is a positive number) BV predictors, the candidate list may or may not include the afore-described initial value.

If the candidate list is configured to include the initial value, the candidate list may be generated so that the initial value is set as a BV predictor. For example, every BV predictor may be set to the initial value, or the first candidate may be set to the initial value and the remaining (k−1) candidates may be set to a zero vector.

Or the encoder may set the initial value and (k−1) BVs already encoded in the current picture as BV predictors. Or the encoder may set (k−1) BVs already encoded in the current CTU other than the current picture and the initial value as BV predictors.

Or according to another embodiment of the present invention, in the absence of a block encoded in the IBC prediction mode before the current block in the CTU, the candidate list may be configured without the initial value. In this case, the encoder may set k BVs already encoded in the current picture or k BVs already encoded in the current CTU other than the current picture, as BV predictors.

Meanwhile, according to another example of the present invention, if the candidate list is configured with a plurality of BV predictors, and there is a block encoded in the IBC prediction mode before the current block in the CTU, the candidate list may or may not include the initial value.

The encoder may set the initial value and (k−1) BVs already encoded in the current picture as BV predictors. Or the encoder may set the initial value and (k−1) BVs already encoded in the current CTU other than the current picture as BV predictors.

Or if the encoder configures the candidate list without the initial value, the encoder may set k BVs already encoded in the current picture as BV predictors, or set k BVs already encoded in the current CTU other than the current picture as BV predictors.

The number of BV predictors included in the BVp candidate list, k may be equal to or less than a maximum value preset between the encoder and the decoder, N (N is a positive number).

BV predictors to be included in the candidate list are determined, and then the predictor index (a BVp index) is assigned to each of the BV predictors.

A BVp index may be assigned to a BV predictor based on a temporal proximity in encoding order between the current block and a BV to be used as the BV predictor. For example, the encoder may assign a lower BVp index to a later encoded BV among the BVs of blocks encoded before the current block.

For example, if the candidate list includes the initial value, BVp index 0 may be assigned to the initial value, and BVp index 1 may be assigned to a last BV encoded right before the current block in a temporal order. Sequentially, BVp index 2 may be assigned to a second last BV encoded before the current block in a temporal order, and BVp index (k−1) may be assigned to a $(k-1)^{th}$ last BV encoded before the current block in a temporal order.

In another example, if the candidate list does not include the initial value, BVp index 0 may be assigned to the last BV encoded right before the current block in a temporal order. BVp index 1 may be assigned to a second last BV encoded before the current block in a temporal order. Sequentially, BVp index (k−1) may be assigned to a $k^{th}$ last BV encoded before the current block in a temporal order.

Or according to another embodiment of the present invention, BVp indexes may be assigned to BV predictors based on the spatial coding proximities between the current block and BVs to be used as the BV predictors. That is, a lower BVp index may be assigned to a BV spatially nearer to the current block in terms of encoding order. That is, the encoder may assign a lower BVp index to a BV spatially nearer to the current block among the BVs of blocks encoded before the current block.

For example, if the candidate list includes the initial value, BVp index 0 may be assigned to the initial value, and BVp index 1 may be assigned to a BV indicating a position spatially nearest to the current block. Sequentially, BVp index 2 may be assigned to a BV indicating a second nearest position to the current block in space, and BVp index (k−1) may be assigned to a BV indicating a $(k-1)^{th}$ nearest position to the current block in space.

In another example, if the candidate list does not include the initial value, BVp index 0 may be assigned to a BV indicating a position spatially nearest to the current block. BVp index 1 may be assigned to a BV indicating a second nearest position to the current block in space. Sequentially, BVp index (k−1) may be assigned to a BV indicating a $k^{th}$ nearest position to the current block in space.

If there are a plurality of BVs having the same spatial proximity, BV predictors may be re-ordered based on temporal proximities of the BVs in the candidate list.

The foregoing embodiments of configuring a candidate list may be applied individually or in combination.

However, if only one BV predictor is used as a candidate, the encoder may not signal BVp index information additionally, and thus the decoder may not parse information relating to the BVp index.

The encoder generates a candidate list by determining BV predictors and assigning BVp indexes to the BV predictors. The BVp indexes may be set in various manners as described above in relation to the embodiments. That is, a lower BVp index may be assigned to a BV having a higher temporal and/or spatial proximity to a current block, and the order of assigning BVp indexes may be preset between the encoder and the decoder.

If a BV allocated to BVp index (n−1) is equal to a BV allocated to BVp index n (0≤n≤k−1), the encoder may replace the BV with BVp index n with the BV with BVp index (n+1).

That is, if the same BV repeatedly occur contiguously or non-contiguously in the candidate list, the redundant BV may be excluded from the candidate list. If a predetermined number of BV predictors are not included in the candidate list, the candidate list may include a BV predictor set to a zero vector or an initial value.

The candidate list may be configured as the following table.

First, if a prediction block for a current block is generated by initially applying the IBC prediction mode in a current picture to which the current block belongs, the candidate list may include an initial value as a predictor candidate, as illustrated in [Table 1].

TABLE 1

| BVp index | 0 |
|---|---|
| BVp | Initial value |

Or if the IBC prediction mode is initially applied to a CTU including a current block, but has been already applied within a current picture, the candidate list of [Table 2] or [Table 3] may be generated depending on whether an initial value is used as a candidate vector.

TABLE 2

| BVp index | 0 | 1 | 2 | ... | k − 1 |
|---|---|---|---|---|---|
| BVp | Initial value | Last coded BV | Last-1 coded BV | ... | First coded BV |

TABLE 3

| BVp index | 0 | 1 | 2 | ... | k − 1 |
|---|---|---|---|---|---|
| BVp | Last coded BV | Last-1 coded BV | Last-2 coded BV | ... | First coded BV |

It is noted from [Table 2] and [Table 3] that a lower BVp index is assigned to a BV having a higher temporal proximity for the coding time point of a current block.

Obviously, BV predictors may be set based on spatial proximities instead of temporal proximities. In this case, a lower BVp index may be assigned to a BV having a higher spatial proximity to the current block.

The candidate list is generated in the above manner, and then the encoder represents a BV indicating a region (a reference block) to be used as a prediction block for the current block by a BV predictor BVp and a BV difference BVd (S420).

The prediction unit for performing IBC prediction determines a region to be used as a reference block needed for generation of a prediction value by searching an area set as a search area among decoded regions in a current picture, for example, a current CTU including the current block or a CTU neighboring to the current CTU in a specific direction.

A BV for the current block is determined by representing the region determined as the reference block for generation of a prediction value using coordinates relative to the coordinates of the current block. The BV of the current block may be expressed as [Equation 2].

$$\vec{BV} = \vec{BVp} + \vec{BVd}$$ [Equation 2]

The BV of the current block is determined, and then the encoder may select a BV predictor BVp optimum in terms of rate-distortion, that is, a BV predictor BVp having a minimum rate-distortion from among the candidate predictors included in the candidate list, as a BV predictor BVp for the current block as described in [Equation 2].

Then, the encoder may signal information indicating the selected BV predictor and a BV difference derived from the BV predictor (S430).

The encoder may derive the BV difference using the BV determined in step S420, the BV predictor selected from the candidate list, and [Equation 2].

The BV predictor and the BV difference are encoded separately and signaled to the decoder.

A BVp index assigned to the BV predictor selected from the candidate list is encoded and signaled, rather than a vector representing the BV predictor is directly encoded and signaled. As described before, if one BV predictor is used as a candidate predictor, information about the BV predictor may not be signaled. A vector corresponding to the BV difference is encoded and signaled.

As described above, information needed for IBC prediction may be signaled according to information indicating that IBC prediction may be performed for the current block. Whether IBC prediction is used or not may be signaled by a sequence parameter set, a picture parameter set, or the like.

Figure 5:
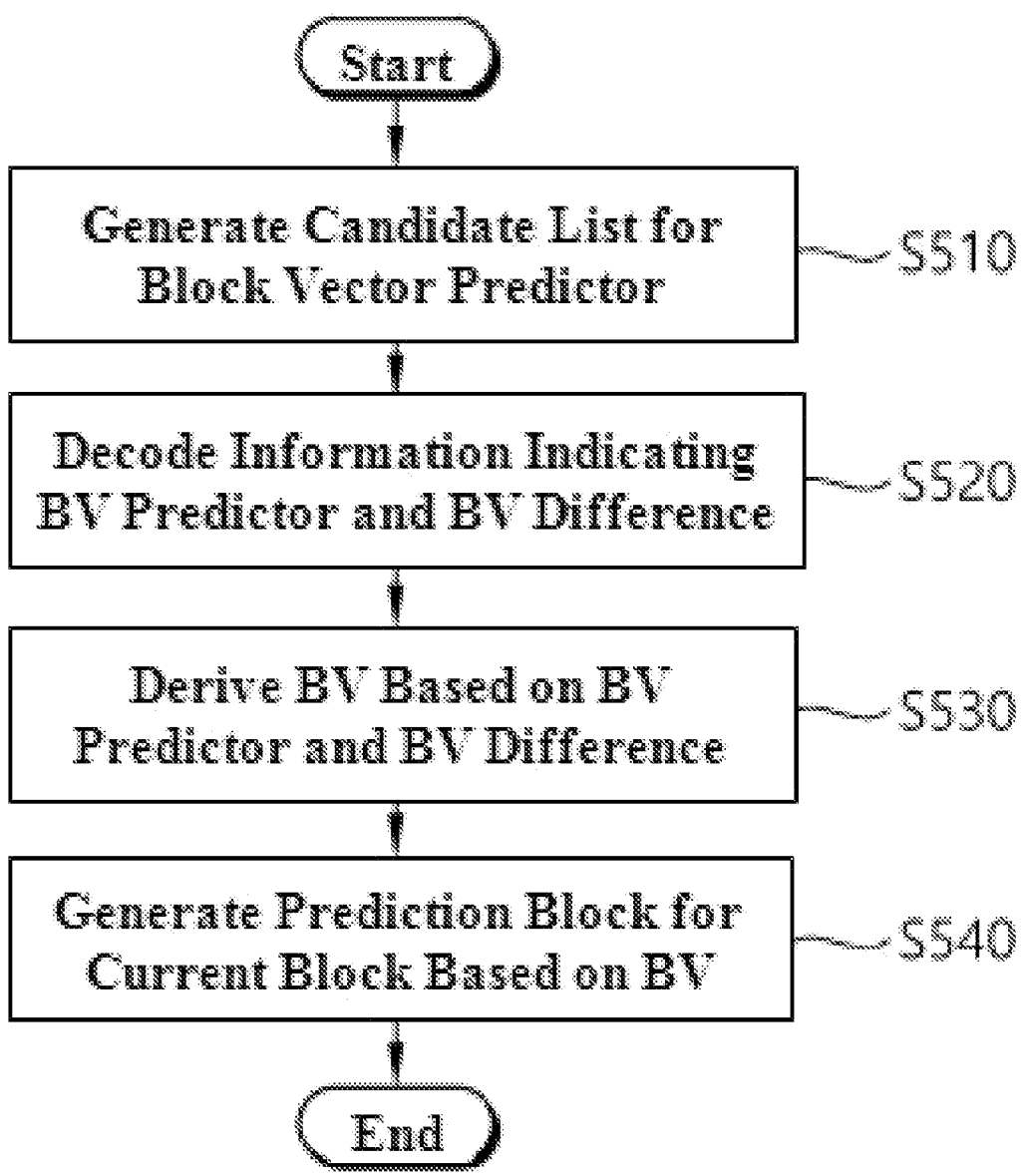
FIG. 5 is a flowchart illustrating a method for decoding an image to which IBC prediction is applied according to an embodiment of the present invention.

FIG. 5 is a flowchart illustrating a method for decoding an image to which IBC prediction is applied according to an embodiment of the present invention. Specifically, FIG. 5 depicts a procedure for predicting a current block based on information signaled from the encoder of FIG. 4.

The decoder may determine whether IBC prediction is used for prediction of a current block, based on information signaled by a sequence parameter set or a picture parameter set. If the current block is predicted in the IBC prediction mode, the prediction unit of the decoder generates a candidate list for a BV predictor to be used as a prediction value of a BV (S510).

The candidate list is generated substantially in the same manner as in FIG. 4 and thus will not be described herein to avoid redundancy. The prediction unit may configure the candidate list by generating BV predictors in a similar procedure to that performed in the encoder.

The decoder may receive information indicating a BV predictor and a BV difference and decode the received information (S520). That is, the decoder may parse the information indicating the BV predictor and the information indicating the BV difference, for the block encoded in the IBC prediction mode.

If use of a single BV predictor candidate is preset between the encoder and the decoder, the decoder may parse only the information about the BV difference.

On the other hand, if use of a plurality of BV predictor candidates is preset between the encoder and the decoder, the decoder may parse a BVp index indicating the BV predictor, and the BV difference.

The decoder may derive a candidate predictor indicated by the BVp index in the generated candidate list, as the BV predictor.

The decoder may derive a BV based on the BV predictor and the BV difference (S530).

The predictor of the decoder derives the BV using the BV predictor, the BV difference, and [Equation 2].

The prediction unit may generate a prediction block for the current block using the derived BV, that is, generate a region indicated by the BV as the prediction block for the current block (S540).

Subsequently, the decoder may recover the current block using a residual value signaled from the encoder. The recovered block is generated in a similar manner to in a conventional video decoding and encoding method, which will not be described herein to avoid redundancy.

As described above, the encoder and the decoder may use a current CTU or picture including a current block in order to derive a reference block for the current block to be predicted, and signal a BV predictor and a BV difference that indicate the reference block.

Figure 6:
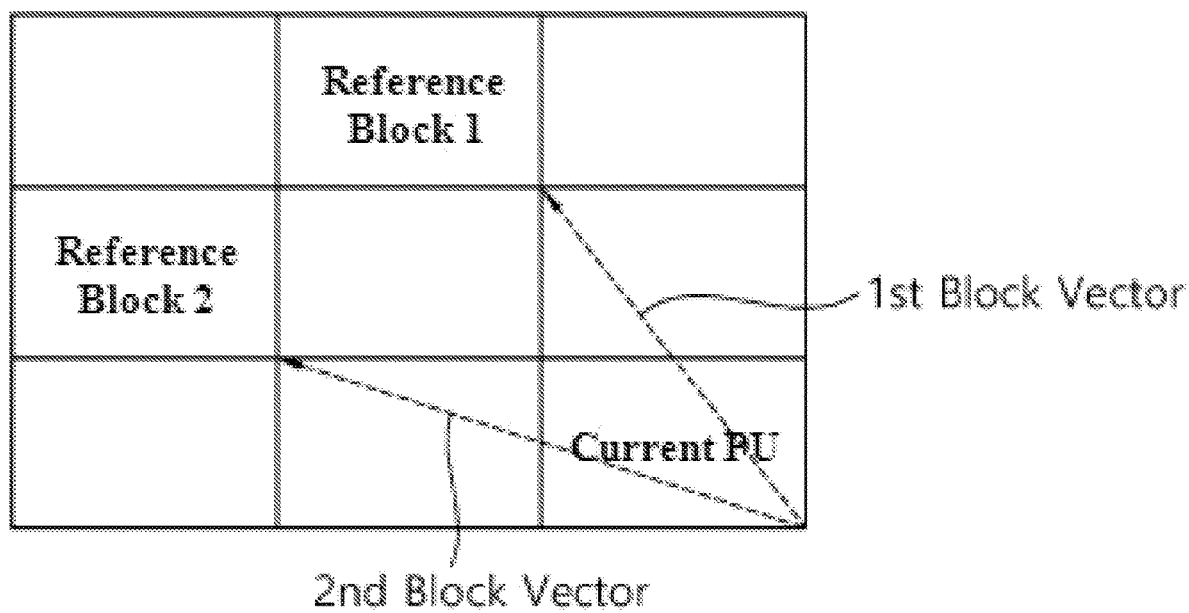
FIG. 6 is a view depicting generation of a prediction block according to another embodiment of the present invention.

FIG. 6 is a view depicting generation of a prediction block according to another embodiment of the present invention.

Referring to FIG. 6, a prediction block for a current block may be generated using two BVs in the embodiment.

The encoder and the decoder may generate the prediction block for the current block, using an average or weighted average of a reference block indicated by a first BV and a reference block indicated by a second BV.

A weight to be used for the weighted average may be determined based on the proximity between the current block and a BV. For example, when a BV is determined based on two BV predictors in a candidate list, as the BVp index of a BV predictor is lower, the BV predictor may be more related to the current block. Accordingly, a higher weight may be assigned to a BV based on a BV predictor having a lower BVp index.

Or a weight to be used for the weighted average may be determined based on the proximity between the current block and a reference block. For example, as a reference block is nearer to the current block among the plurality of reference blocks, the reference block may have a higher weight.

Two or more BV predictors may be used in generating a prediction block. If a plurality of BV predictors are used, the encoder may signal two or more BVp indexes for the BV predictors.

The encoder and the decoder may generate a prediction block by filtering the values of the reference blocks indicated by the plurality of BV predictors. For the filtering, a filter preset between the encoder and the decoder may be used. Or the filter indicated by signaling information in a bit stream may be used. After the values of the plurality of reference blocks are filtered respectively, the prediction block of the current block may be generated using the average or weighted average of the filtered results. The weighted average is calculated in the above-described manner.

As in this embodiment, if a prediction value is generated using a plurality of BVs, noise that may be produced in a high Quantization Parameter (QP) encoding environment may be reduced.

As described above, the present invention provides a method and apparatus for, if a similar pattern occurs repeatedly in a picture, performing prediction between the patterns on a block basis, thereby increasing a coding efficiency during video compression.

While the methods are described as a series of steps or blocks based on a flowchart in the foregoing embodiments, the present invention is not limited to the order of steps. Some steps may take place in a different order or simultaneously. Further, those skilled in the art will understand that the steps of the flowchart are not exclusive, and thus another step may be added to the flowchart or one or more steps may be deleted in the flowchart without affecting the scope of the present invention.

The foregoing embodiments include various types of examples. Although it is impossible to describe every possible combination produced from the various types of examples, those skilled in the art will be aware that other combinations are possible. Accordingly, it is to be understood that the present invention covers various modifications, equivalents, and alternatives lying within the appended claims.

DESCRIPTION OF REFERENCE NUMERALS

| | |
|---|---|
| 100: video encoder | 110: prediction unit |
| 125: subtractor | 130: transformer |
| 140: quantizer | 150: entropy encoder |
| 160: dequantizer | 170: inverse transformer |
| 175: adder | 180: filter unit |
| 190: reference picture buffer | |
| 200: video decoder | 210: entropy decoder |
| 220: dequantizer | 230: inverse transformer |
| 240: prediction unit | 255: adder |
| 260: filter unit | 270: reference picture buffer |

The invention claimed is:

1. A video decoding method comprising:
determining whether intra block copy (IBC) prediction is used or not based on a 1-bit flag signaled by a sequence parameter set;
deriving, in case IBC prediction is determined to be used, a vector predictor of a block vector indicating a reference block for a current block to be predicted in a current picture;
deriving the block vector based on the vector predictor and a vector difference corresponding to a difference between the block vector and the vector predictor; and
generating a prediction block for the current block based on the block vector,
wherein both the current block and the reference block are included in the current picture,
wherein the deriving the vector predictor comprises
generating a candidate list including a plurality of vector predictor candidates based on block vectors of blocks decoded by IBC prediction before the current block;
determining whether a number of vector predictor candidates included in the candidate list is less than a predetermined number;
adding a zero vector candidate into the candidate list in case the number of vector predictor candidates included in the candidate list is less than the predetermined number; and
deriving the vector predictor based on a predictor index indicating one of the vector predictor candidates included in the candidate list,
wherein the predictor index is obtained by
determining whether or not the predetermined number is greater than 1;
decoding, in case the predetermined number is greater than 1, information on the predictor index included in a bitstream; and
assigning, in case the predetermined number is 1, a predetermined value as the predictor index without decoding the information on the predictor index, and
wherein a block vector is not included in the candidate list in case the candidate list includes a vector predictor candidate as same as the block vector.

2. The video decoding method according to claim 1, wherein the prediction block is generated by filtering a sample value of the reference block.

3. The video decoding method according to claim 2, wherein the filtering is performed using a filter preset between an encoder and a decoder or a filter indicated by signaling information in a bit stream.

4. The video decoding method according to claim 1, wherein the candidate list includes a predetermined initial value as one of the vector predictors.

5. The video decoding method according to claim 1, wherein if a plurality of predictor indexes are parsed, the generation of a prediction block comprises generating the predictor block based on a plurality of reference blocks indicated by a plurality of block vectors.

6. The video decoding method according to claim 5, wherein a value of the prediction block is a weighted average of values of the reference blocks.

7. A video encoding method comprising:
determining whether intra block copy (IBC) prediction is used or not;
deriving, in case IBC prediction is determined to be used, a vector predictor of a block vector indicating a reference block for a current block to be predicted in a current picture;
encoding information indicating the vector predictor and a vector difference corresponding to a difference between the block vector and the vector predictor; and
encoding a 1-bit flag indicating whether IBC prediction is used or not into a sequence parameter set,
wherein both the current block and the reference block are included in the current picture,
wherein the encoding the information indicating the vector predictor comprises
generating a candidate list including a plurality of vector predictor candidates based on block vectors of blocks encoded by IBC prediction before the current block;
determining whether a number of vector predictor candidates included in the candidate list is less than a predetermined number;
adding a zero vector candidate into the candidate list in case the number of vector predictor candidates included in the candidate list is less than the predetermined number;
determining a predictor index indicating one of the vector predictor candidates included in the candidate list; and
encoding the information indicating the vector predictor based on the predictor index, wherein the information indicating the vector predictor is encoded by determining whether or not the predetermined number is greater than 1;

encoding, in case the predetermined number is greater than 1, the information indicating the vector predictor into a bitstream; and skipping the encoding of the information indicating the vector predictor into a bitstream in case the predetermined number is 1, and wherein a block vector is not included in the candidate list in case the candidate list includes a vector predictor candidate as same as the block vector.

8. The video encoding method according to claim 7, wherein the candidate list includes a predetermined initial value as one of the vector predictors.

9. A non-transitory computer-readable recording medium storing a bitstream generated by a video encoding method, the video encoding method comprising:

determining whether intra block copy (IBC) prediction is used or not;

deriving, in case IBC prediction is determined to be used, a vector predictor of a block vector indicating a reference block for a current block to be predicted in a current picture;

encoding information indicating the vector predictor and a vector difference corresponding to a difference between the block vector and the vector predictor; and encoding a 1-bit flag indicating whether IBC prediction is used or not into a sequence parameter set, wherein both the current block and the reference block are included in the current picture, wherein the encoding the information indicating the vector predictor comprises generating a candidate list including a plurality of vector predictor candidates based on block vectors of blocks encoded by IBC prediction before the current block;

determining whether a number of vector predictor candidates included in the candidate list is less than a predetermined number;

adding a zero vector candidate into the candidate list in case the number of vector predictor candidates included in the candidate list is less than the predetermined number;

determining a predictor index indicating one of the vector predictor candidates included in the candidate list; and encoding the information indicating the vector predictor based on the predictor index, wherein the information indicating the vector predictor is encoded by determining whether or not the predetermined number is greater than 1;

encoding, in case the predetermined number is greater than 1, the information indicating the vector predictor into a bitstream; and skipping the encoding of the information indicating the vector predictor into a bitstream in case the predetermined number is 1, and wherein a block vector is not included in the candidate list in case the candidate list includes a vector predictor candidate as same as the block vector.

* * * * *